United States Patent
Burns et al.

(10) Patent No.: US 6,665,295 B1
(45) Date of Patent: Dec. 16, 2003

(54) CONVERSION OF A PERMANENT CONNECTION INTO A SIGNALED PERMANENT CONNECTION

(75) Inventors: John C. Burns, Kanata (CA); Jonathan L. Bosloy, Kanata (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/365,236

(22) Filed: Jul. 30, 1999

(30) Foreign Application Priority Data

Dec. 4, 1998 (CA) .............................................. 2255383

(51) Int. Cl.[7] .............................................. H04L 12/28

(52) U.S. Cl. .................................... 370/389; 370/395.6

(58) Field of Search .............................. 370/389, 395.1, 370/395.6, 397, 399, 409, 465, 410, 522

(56) References Cited

U.S. PATENT DOCUMENTS

| | | | | |
|---|---|---|---|---|
| 6,055,239 A | * | 4/2000 | Kato | 370/409 |
| 6,115,380 A | * | 9/2000 | Christie et al. | 370/395.3 |
| 6,118,782 A | * | 9/2000 | Dixon et al. | 370/389 |
| 6,125,119 A | * | 9/2000 | Cherukuri et al. | 370/410 |
| 6,147,965 A | * | 11/2000 | Burns et al. | 370/216 |
| 6,292,463 B1 | * | 9/2001 | Burns et al. | 370/216 |
| 6,404,765 B1 | * | 6/2002 | Bernstein et al. | 370/389 |

OTHER PUBLICATIONS

ATM Forum, "Private Network–NetworkInterface Specification Version 1.0", Document No. af–p–nni–0055.00,Mar. 1996.

* cited by examiner

Primary Examiner—Chau Nguyen
Assistant Examiner—Keith M. George
(74) Attorney, Agent, or Firm—Marks & Clerk

(57) ABSTRACT

A method of converting a permanent connection, such as a PVC, into a signalled permanent connection, such as an S-PVC, in a connection-orientated network, such as an ATM network, without service disruptions. The method includes the steps of: (a) establishing signalling links between each network node along the path of the permanent connection; (b) providing information to identify the cross-connections along the path; (c) incorporating the cross-connect identification information in a call set-up message; (d) signalling the call set-up message along the path from a source network node to a destination network node; and (e) associating the cross-connection of each node along the path with the appropriate signalling links in order to form the signalled permanent connection. The cross-connect identification information may be a unique call identifier for the permanent connection, in circumstances where the call identifier is associated with the permanent connection cross-connections prior to Step (d). Alternatively, the cross-connect identification information may be a permanent connection path definition specifying each cross-connection is the path. A similar method for converting a signalled permanent connection into a permanent connection is also disclosed.

23 Claims, 8 Drawing Sheets

CONVERSION OF A PERMANENT CONNECTION INTO A SIGNALED PERMANENT CONNECTION

FIELD OF INVENTION

The invention relates generally to the field of connection-orientated data networks and more particularly to a method and apparatus for converting a permanent connection, such as a permanent virtual circuit, into a signalled permanent connection, such as a soft permanent virtual circuit, particularly within an asynchronous transfer mode (ATM) network.

BACKGROUND OF INVENTION

A permanent connection, such as a permanent virtual circuit or PVC, comprises a series of interconnected bearer channels (hereinafter "bearer channel path") which exists for a long time between two or more end-stations and is set up through subscription with a service provider. The service provider defines or provisions the permanent connection manually, or alternatively through the use of a network management system (NMS) which is linked to all of the network elements or nodes. If the permanent connection is manually commissioned, the system operator must manually select the route for the bearer channel path across the network. Then, through the use of a network management terminal interface (NMTI), the system operator must manually configure and establish each individual bearer channel cross-connection on each node by setting or adjusting its routing table and allocating the appropriate amount of connection bandwidth. Next, the bearer channel identifiers, e.g. VPI/VCI, used by the end-stations for information transfer must be manually allocated and reported thereto. In addition, in the event of a failed link between nodes, the many bearer channel paths carried by the link must generally be manually re-routed, which can be quite a difficult chore.

The NMS offers many advantages over the manual commissioning of cross-connects. In particular, the NMS is capable of automatically computing the route across the network for the bearer channel path and automatically configuring and establishing the individual cross-connects. In addition, because the NMS is connected to each node through an overlay network, the nodes can inform the NMS about a failed link and it can automatically reroute bearer channel paths associated with the failed link. Due to the efficacy of the NMS, most sizeable permanent connection networks employ such as device. A commercially available example of a network management system is the MainStreet Xpress™ 46020 Network Manager manufactured by Newbridge Networks Corporation of Kanata, Ontario, Canada.

A switched connection, such as a switched virtual connection or SVC, is created and released on-the-fly by the end-stations and nodes through the exchange of a series of signalling messages using a signalling protocol. The signalling between nodes is carried over a signalling network comprising call control infrastructure disposed on each node, and signalling links, such as a dedicated PVC, for interfacing or communicating between similar infrastructure disposed on counterpart nodes. Generally, the signalling messages include a "call set-up" message sent by the originating end-station to the destination end-station across the network. The call set-up message includes, among other things, the destination address and quality of service parameters. In hop-by-hop routing, each node which receives the call set-up message consults a routing table resident thereon in order to determine the next hop and bearer channel link towards the destination end-station, and establishes the bearer channel cross-connect. In source routing, the ingress node maintains a database representative of the topology of the network and specifies the path, and optionally the links, for the call in the call set-up message. Thus, each node which receives the call set-up message is directed to progress it to the next node in the pre-specified path. Irrespective of which method of routing is used, the call will steer itself through the network to the destination end-station which will send an acknowledgement, such as a reply "connect" message, back to the originating end-station. A further "connect acknowledge" message may be sent to the destination end station from the originating end station. As a result of this exchange of messages, bandwidth is allocated and an end-to-end uni- or bi-directional bearer channel path is thereby established. At the end of the information transfer, the bearer channel for the call may be torn down, i.e, the cross-connects are dismantled, by another series of signalling messages.

Recently, standards have been adopted to provide signalled permanent connection capability such as signalled permanent virtual circuits or S-PVCs (alternatively referred to as "SPVC" or "soft permanent virtual circuits"). An S-PVC is provisioned by the system operator, either directly through the NMTI or indirectly through the NMS, but the bearer channel path and the cross-connects thereof are established by signalling in a manner similar to that of an SVC. More particularly, the S-PVC is typically commissioned by instructing an ingress node (via the NMTI or NMS) to initiate the S-PVC. The call control infrastructure on the node creates an S-PVC call set-up message (e.g. for hop-by-hop or source routing), which is similar to the SVC call set-up message, and sends it over the signalling network to the next node, which does the same. In this manner the bearer channel path is signalled across the network until it reaches the egress node. The egress node is able to resolve the destination address specified in the S-PVC call set-up message, and sends an acknowledgement back to the source node, and thereby, to the system operator. The edge nodes do not, however, signal the end-stations over the user-to-network interfaces (UNIs) therebetween (assuming the end-stations support UNI signalling) as in the case of an SVC. Thereafter, the end-stations can be manually configured to transmit the provisioned bearer channel identifiers.

The S-PVC is attractive to the service provider because, from the view point of the customer, who is not concerned how the bearer channel is created, it appears that a PVC has been provided. However, the S-PVC provides a robust and efficient path management strategy. In particular, in the event of a failed link between nodes, an S-PVC can be automatically re-routed by the network through the use of the signalling protocol. For example, when the ingress node receives a message to release the S-PVC and the indicated cause for the release is a link failure, the ingress node can consult its resident routing table, select an alternate path, and re-signial the S-PVC call set-up message. Reroutes can be accomplished significantly faster using the distributed computing power of the network than by the NMS. In addition, the recent move by the industry to the adoption of standards such as the ATM Forum P-NNI protocol to enable nodes to dynamically exchange routing information, and hence keep up to date about network conditions, allows for a more robust network recovery mechanism.

Accordingly, with the advent of signalled permanent connections capability such as S-PVCs, the need for a network management system providing centralized bandwidth management for the establishment of bearer channel paths is lessened. In short, S-PVCs are taking over where centralized PVC strategies were once used. However, there are many large legacy PVC networks in existence comprising many thousands of permanent connections. In the prior art, if the service provider wished to convert on existing PVC network into an S-PVC network, each PVC had to be manually disconnected and re-established as an S-PVC path. This is very time consuming in terms of manual operator time and the amount of time the bearer channel paths are unavailable to customers. Also, since the S-PVC path is defined and managed by the network, there is no guarantee that the original cross-connects and bearer channel identifiers, e.g. VPI/VCIs, will be used by the new S-PVC paths, thus requiring much work to manually re-configure the end-stations.

SUMMARY OF THE INVENTION

Broadly speaking, the invention provides a method of converting a permanent connection, such as a PVC, into a signalled permanent connection, such as an S-PVC, in a connection-orientated network, such as an ATM network. The method comprises the steps of: (a) establishing signalling links between each network node along a permanent connection path; (b) providing information to identify the cross-connections along the path; (c) incorporating the cross-connect identification information in a call set-up message; (d) transmitting the call set-up message along the path from a source network node to a destination network node; and (e) associating the cross-connection of each node along the path with the appropriate signalling links in order to form the signalled permanent connection. The cross-connect identification information may be a unique call identifier for the permanent connection, in circumstances where the call identifier is associated with each permanent connection cross-connection prior to step (d). Alternatively, the cross-connect identification information may be a permanent connection path definition specifying each cross-connection in the path.

Another aspect of the invention relates to an apparatus for converting a permanent connection into a signalled permanent connection in a connection-orientated network comprising interconnected network nodes. The apparatus comprises signalling means for communicating signalling messages between network nodes along a permanent connection path. A network management system is connected to the network nodes along the path, and includes means for providing information to identify a bearer channel cross-connection made on each network node along the path. Call processing means are distributed on each node along the path for incorporating the cross-connect identification information in a call set-up message, signalling the call set-up message along the path from a source node to a destination node, and associating the cross-connection identified on each node along the path with the signalling means to form the signalled permanent connection.

In the preferred embodiment, the network management system (NMS) maintains a database of all PVCs and their paths in an ATM network. The NMS establishes a unique identifier for each PVC in the network and transmits the unique identifier to each node along the path of a given PVC. The nodes tag or otherwise associate the unique identifier of each PVC with the corresponding bearer channel cross-connects established thereon. Means are provided for establishing ATM signalling links between each pair of nodes in the network. The NMS instructs the ingress node of each PVC to signal over the signalling links a source-routed, S-PVC call set-up message, which includes the unique PVC identifier and a "convert PVC into S-PVC" instruction. Each node, including the ingress node, which receives this S-PVC call set-up message searches for an active cross-connect that has been previously labelled or tagged with the unique call identifer and, if a match is found, uses the existing, tagged, cross-connect to progress the S-PVC call set-up. When the S-PVC call set-up message reaches the destination or egress network node, an acknowledging connect message is sent back to the ingress node and it signals the successful conversion of the corresponding PVC into an S-PVC to the NMS. Thereafter, the NMS deletes the converted PVC from the NMS database.

BRIEF DESCRIPTION OF DRAWINGS

The foregoing and other aspects of the invention will become more apparent from the following description of the preferred embodiment thereof and the accompanying drawings which illustrate, by way of example, the principles of the invention. In the drawings.

DETAILED DESCRIPTION OF PREFERRED EMBODIMENTS

Figure 1:
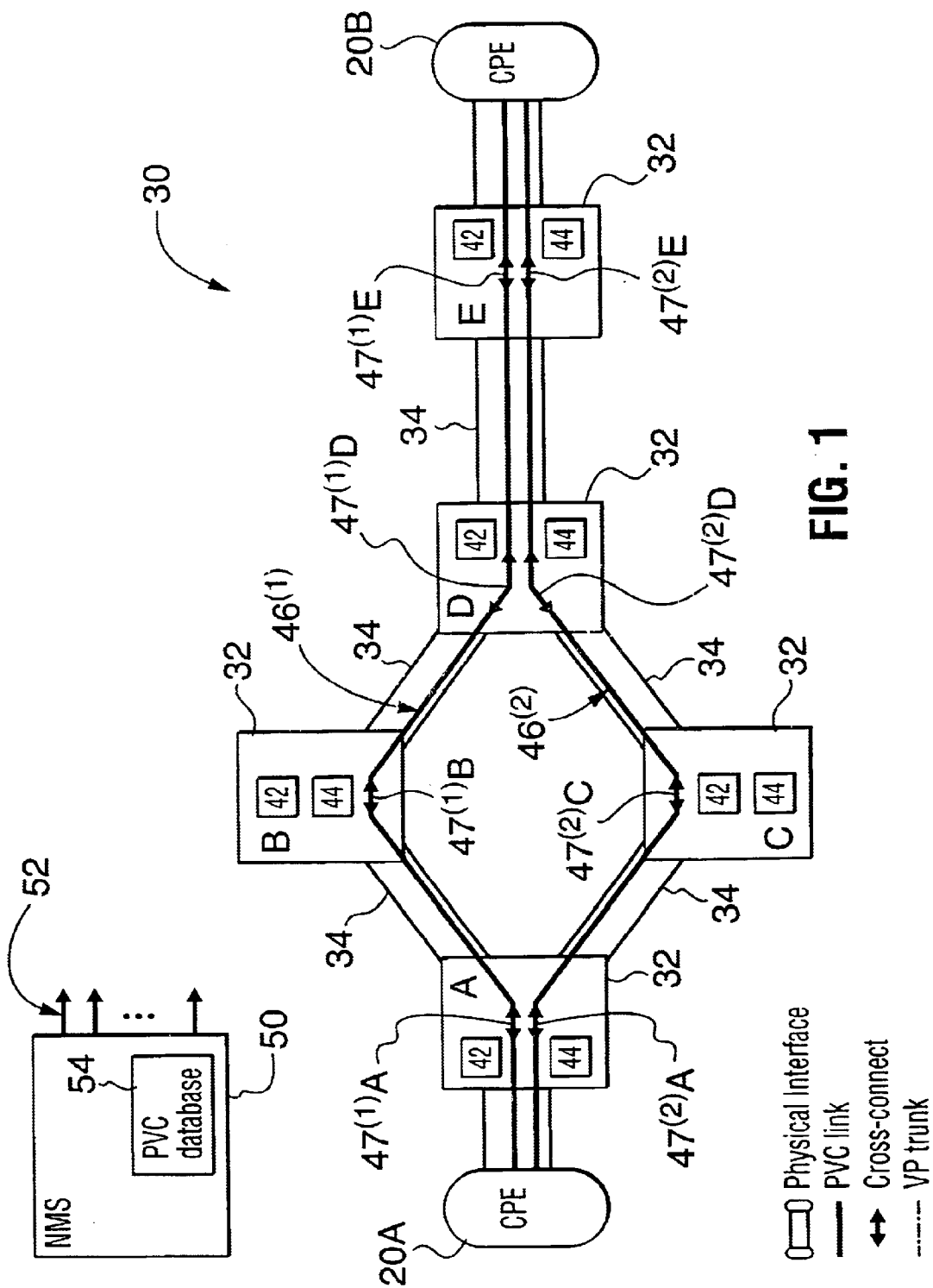
FIG. 1 is a diagram of a reference network showing existing PVC paths therein.

The network environment in which the preferred embodiment operates in is an ATM network which employs the Private Network-to-Network Interface (P-NNI) protocol described in the reference "Private Network-Network Interface Specification Version 1.0 (P-NNI 1.0)", doc. no. af-p-nni-0055.00, March 1996, published by the ATM Forum, which is incorporated herein by reference in its entirety. A reference P-NNI ATM network 30 which comprises a plurality of interconnected network elements or nodes 32 is shown in FIG. 1. For ease of reference, individual nodes are identified by an alphabetical suffix, e.g., A, B or C and referenced elements of a given node are also generally labelled with the same suffix used to identify the node. The nodes 32 are interconnected through standard ports or physical interfaces 34, such as well known OC-3, OC-12 and DS3 fibre optic or electrical interfaces.

Figure 2:
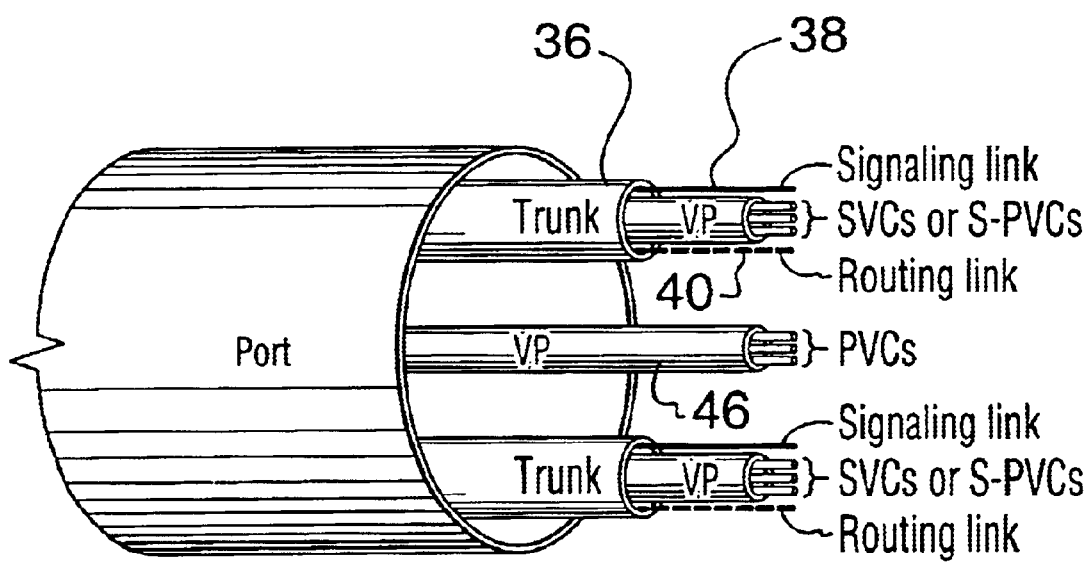
FIG. 2 is a schematic diagram showing how the bandwidth of a physical interface is partitioned into various types of connections and signalling links.

FIG. 2 shows how the bandwidth of a given physical interface 34 is logically partitioned in the preferred embodiment into "virtual path (VP) trunks" 36 (not shown in FIG. 1) which comprise a plurality of SVCs and an associated P-NNI signalling link 38 and a P-NNI routing link 40. More specifically, each node 32 comprises a P-NNI signalling module 42 (FIG. 1) for carrying out a P-NNI signalling protocol, which is based on ATM Forum UNI signalling with extensions to support P-NNI functions. Peer signalling modules 42 communicate over the P-NNI signalling link 38 therebetween. The signalling link 38 is a virtual circuit dedicated for the communication of signalling information between network nodes with respect to a plurality of SVCs (or S-PVCs, which use SVC services) associated with a given VP trunk. Collectively, the signalling modules 42 and associated P-NNI signalling links 38 provide a signalling means for forwarding or carrying P-NNI signalling protocol messages, including connection-orientated messages such as call Set-up, Call Proceeding, Connect and Release messages as defined in the P-NNI reference, to and between network nodes 32.

Similarly, each node 32 comprises a P-NNI routing module 44 for carrying out a P-NNI routing protocol wherein nodes exchange topology information with one another over the P-NNI routing links 40 in order to dynamically compute paths through the network. The P-NNI routing links 40, which are preferably also virtual circuits associated with a corresponding trunk group, carry P-NNI routing protocol messages such as Hello, PTSP, Database Summary, PTSE request and PTSPs acknowledgement messages to and from neighbour nodes. Further information regarding the P-NNI routing and signalling protocols may be found in the above noted P-NNI reference.

Some of the bandwidth of the physical interface 34 is also reserved for PVCs 46. Since the PVCs 46 are not established by signalling, they are not associated with the VP trunks 36. In FIG. 1, two PVCs $46^{(1)}$ and $46^{(2)}$ are shown connected between customer premise equipment 20A and 20B through different network paths. Cross-connects $47^{(1)}A$, $47^{(1)}B$, $47^{(1)}D$ and $47^{(1)}E$, associated with PVC $46^{(1)}$, and cross-connects $47^{(2)}A$, $47^{(2)}C$, $47^{(2)}D$, and $47^{(2)}E$ associated with PVC $46^{(2)}$ are also symbolically shown in FIG. 1. (FIG. 1, however, does not show any of the VP trunks 36 or associated P-NNI links 38 and 40 established between nodes 32.)

Figure 3:
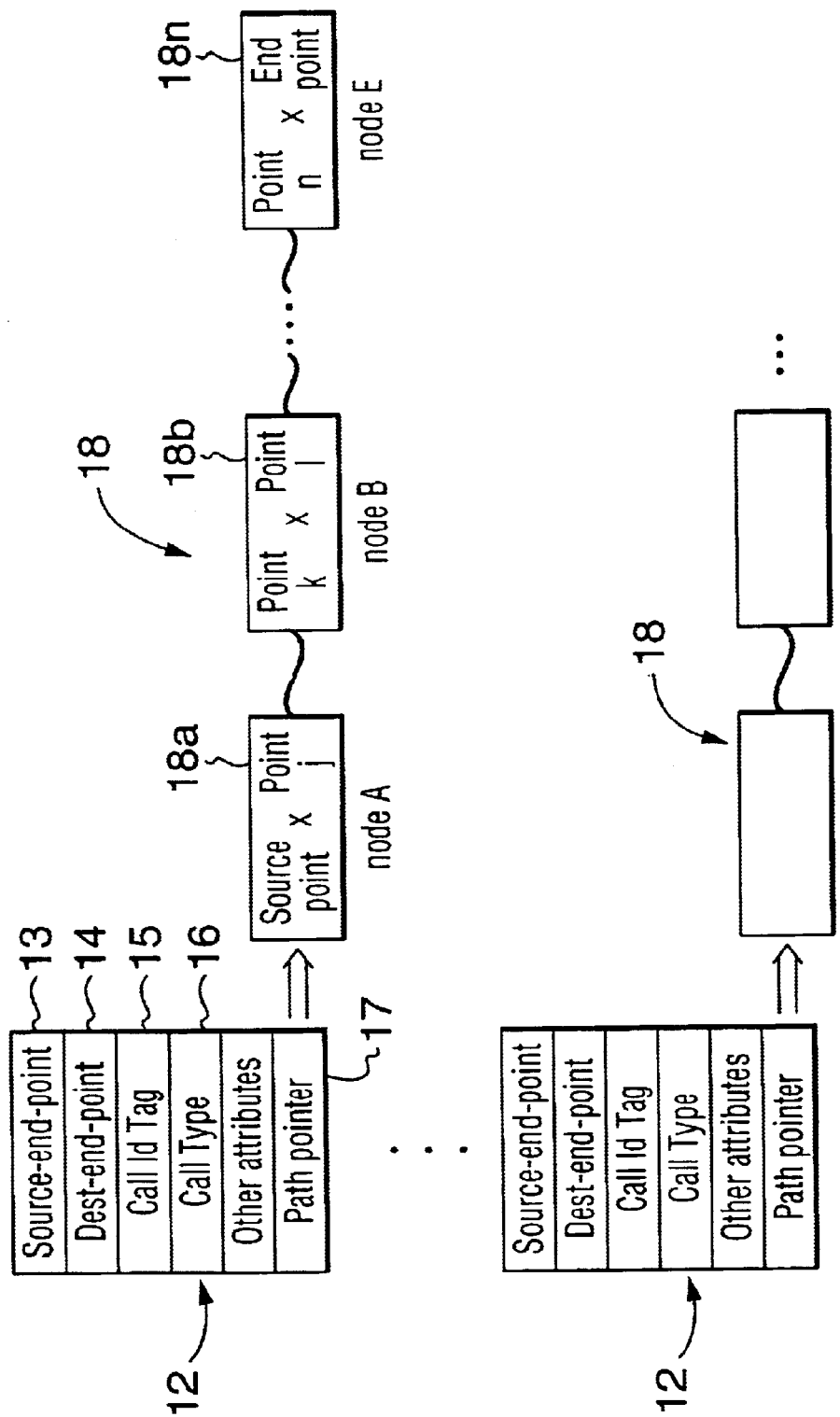
FIG. 3 is a schematic diagram of a simplified database structure employed on an NMS for representing a PVC.

The network 30 is also connected to a network management system (NMS) 50 such as described above. In the preferred embodiment, the NMS 50 is connected to the network nodes 32 through a dedicated virtual control channel (partially shown in FIG. 1 by reference no. 52), but in alternative embodiments the NMS can be connected to the nodes through an overlay control network, e.g., the public telephone network. The NMS 50 maintains a database 54 that stores network topology information for each PVC managed by it. FIG. 3 illustrates a (simplified) call definition record 12 employed by the NMS 50 for describing or defining connections such as PVCs or S-PVCs managed by it. The record 12 comprises a source end-point field 13 for storing a source or originating end-point of the call, and a destination end-point field 14 for storing the destination point of the call. (As mentioned, these will be the ingress and egress points into the network 30.) In the preferred embodiment, an "end-point" comprises a network node address, physical port identifer, virtual path identifier (VPI) and virtual connection identifier (VCI), although in alternative equipment other indicia may be used depending on the configuration thereof. A call type field 16 indicates the type of connection, i.e., PVC or S-PVC. The record 12 also includes a pointer 17 to a path definition 18 which in the preferred embodiment comprises a linked list featuring entries 18a to 18n, each of which identifies a specific cross-connect made on a node disposed along the connection path.

Figure 4:
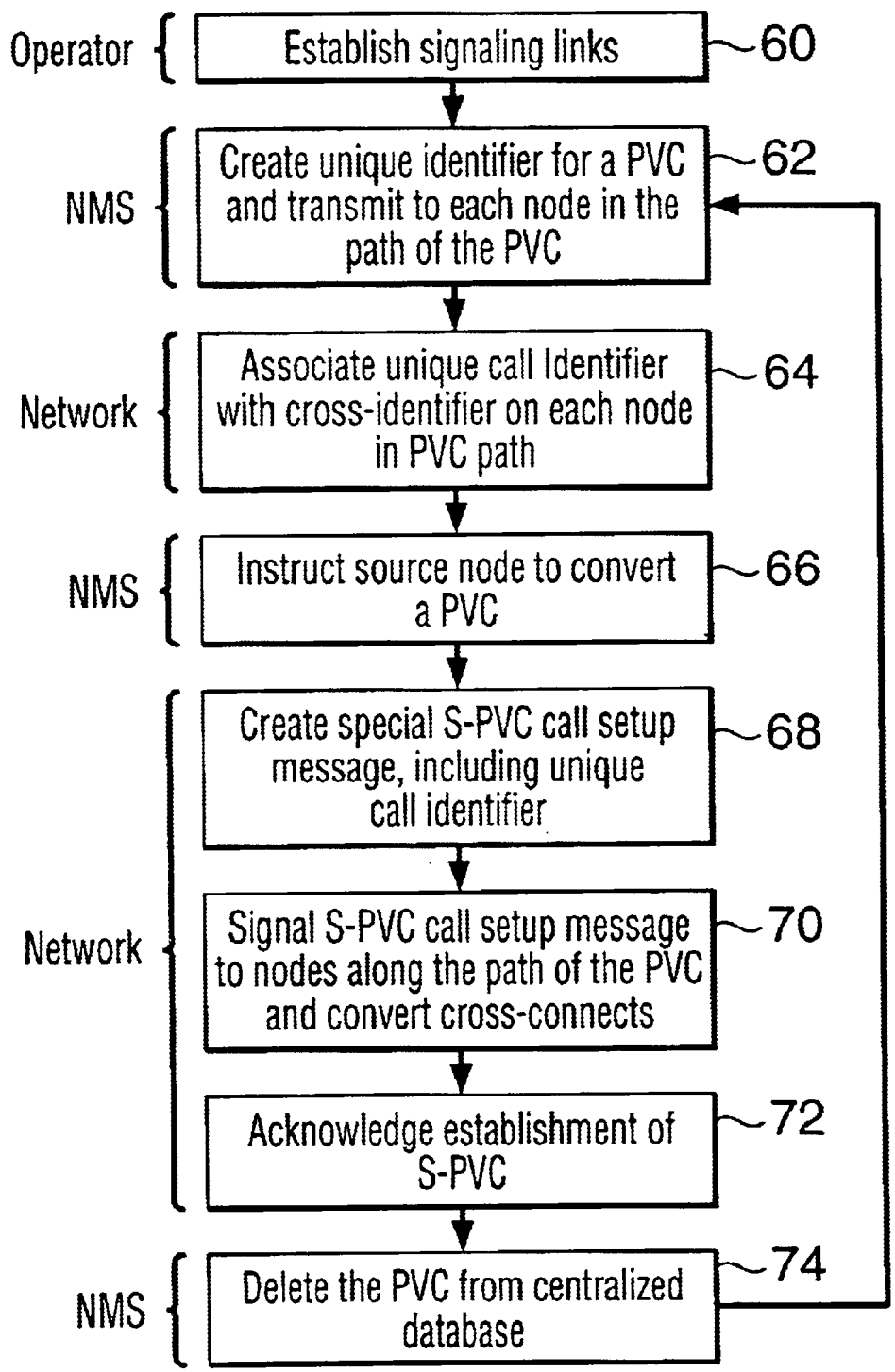
FIG. 4 is a flowchart of a method according to the preferred embodiment for converting a PVC into an S-PVC.
Figure 5:
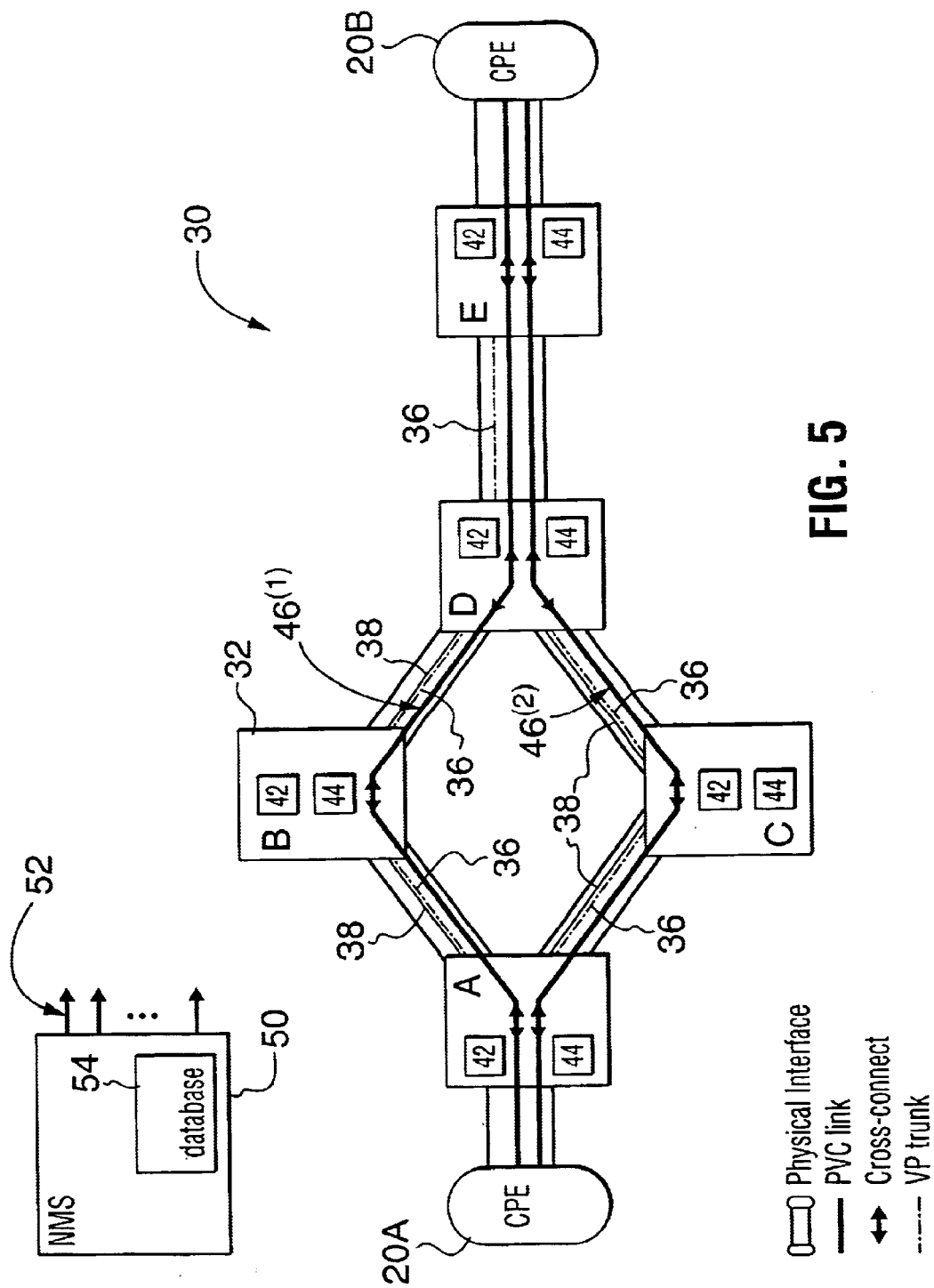
FIG. 5 is a diagram of the reference network showing signalling links established parallel to the existing PVC links.
Figure 9:
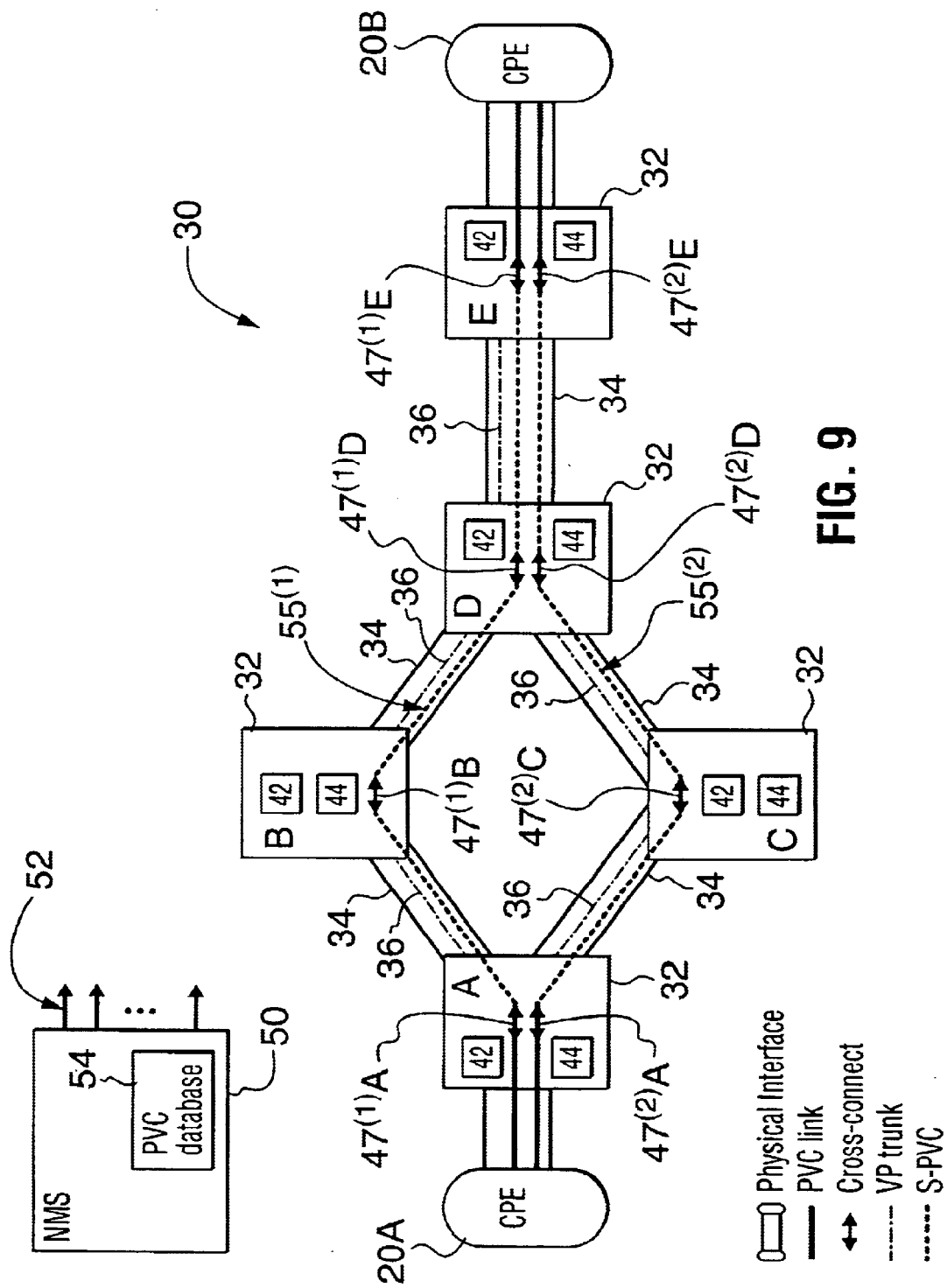
FIG. 9 is a diagram of the reference network showing S-PVCs replacing the prior PVCs.

FIG. 4 illustrates a method according to the preferred embodiment for converting existing PVCs 46 managed by the NMS 50 into S-PVCs 55 (see FIG. 9) managed by the network 30. An initial step 60 involves establishing VP trunks 36 between adjacent network nodes 32 so that a P-NNI signalling link 38 will exist between each successive pair of nodes 32 in the path of any given PVC destined for conversion. This is shown in FIG. 5, where VP trunks 36 are established parallel to the existing PVC links or bearer channels of PVCs $46^{(1)}$ and $46^{(2)}$ in network 30. The manner in which the VP trunks 36 may be established will differ depending upon the manufacturer of the network equipment and the specific operation thereof, but typically VP trunks, and more generally P-NNI signalling links, are manually provisioned by a human operator through an interface such as the NMTI, as known in the art per se. The VP trunks 36 may be established specifically for the conversion of PVCs into S-PVCs, but previously-established trunk groups which have existing SVC or S-PVC traffic may also be used. Once a given VP trunk 36 is established, the corresponding pair of nodes are able to communicate P-NNI signalling information over the P-NNI signalling link 38 therebetween, whereby SVCs may then be established within the corresponding VP trunks.

In process step 62 (FIG. 4), the NMS 50 creates a unique, network-wide, call identifier for each PVC 46 managed by the NMS which is destined to be converted. (The call identifier is stored in a Call ID Tag field 15 of the NMS call definition record 12 shown in FIG. 3.). The NMS 50, using the virtual control channel 52 and a suitable communications protocol, transmits a cross-connect update message to each node 32 in the path of a given PVC 46. The cross-connect update message, which includes the PVC cross-connect end-point information, forwards the unique call identifier for the given PVC and instructs the node to store or otherwise associate the unique call identifier with the corresponding PVC cross-connect made on the node. Thus, for example, in the reference network 30 of FIG. 1, nodes 32A, 32B and 32D and 32E receive the unique call identifier associated with PVC $46^{(1)}$, and nodes 32A, 32B and 32C and 32E receive the unique call identifier associated with PVC $46^{(2)}$.

Figure 6:
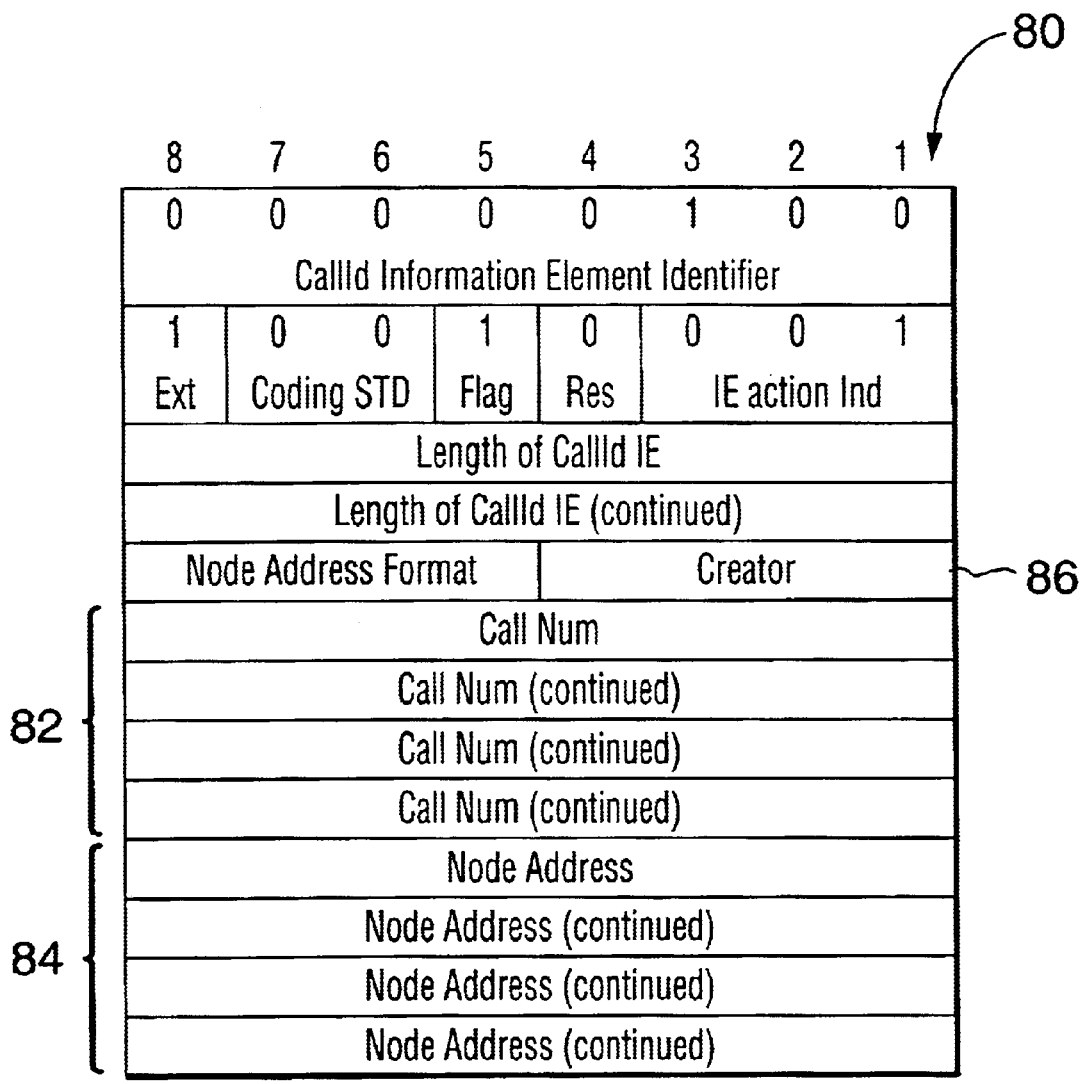
FIG. 6 is a diagram of an information element (IE) which carries a unique network-wide identifier for labelling a PVC destined to be converted into an S-PVC.

The preferred structure of the unique call identifier is illustrated as an information element (IE) 80 in FIG. 6. The data portion of IE 80 preferably comprises three fields: a four byte address field 82 representative of the ingress node (alternatively referred to in the art as the "source point" code); a four byte field 84 representing a unique number selected by the NMS; and a four bit field 86 representing the creator of the call identifier, which in this case is the NMS. Collectively, these three fields uniquely identify a call such as PVC 46 across the network 30.

Figures 7, 8:
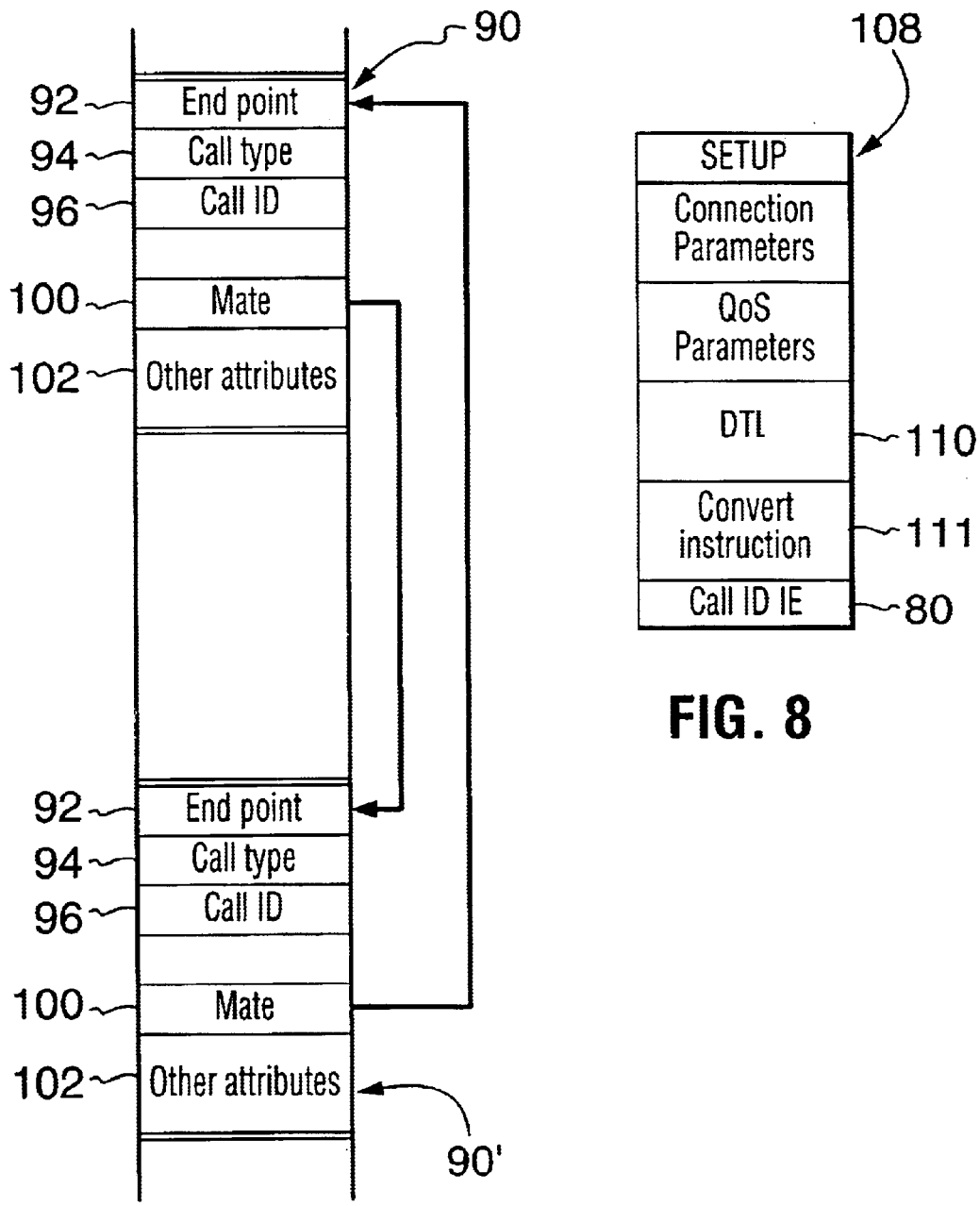
FIG. 7 is a schematic diagram of a simplified database structure for representing a bearer channel cross-connection on a network node.
FIG. 8 is a diagram of an S-PVC call set-up message according to the preferred embodiment.

FIG. 7 illustrates a (simplified) data structure for defining a cross-connect on individual nodes 32. A given cross-connection is represented by two entries 90 and 90'. Each entry comprises an "end-point" field 92 which specifies one end-point of the cross-connection, e.g. physical port, VPI and VCI. The entry also includes a "mate field" 100 which points to counterpart entry 90' which indicates the opposite end-point for the cross-connect.

Each entry 90 also includes a variety of other fields, including:

a. a "call type" field 94 which specifies the type of connection the corresponding cross-connection is, e.g. PVC or SVC;

b. a "call ID" field 96 for storing the above-described unique call identifier associate with the connection; and c. other attributes 102 specific to the type of connection.

Accordingly, upon receipt of the cross-connect update message from the NMS 50, at process step 64 (FIG. 4) each node 32 stores the unique call identifer with the cross-connect entries 90 and 90' specified in the update message. This enables every PVC cross-connection in the network 30 to be associated with the corresponding PVC and provides a "trail" of PVC cross-connects which can uniquely be followed across the network 30, as described in greater detail below.

At process step 66, the NMS 50 identifies the source or ingress node for a given PVC and, using the virtual control channel 52, passes the call definition record 12 and associated path definition 18 of a PVC to its ingress node along with an instruction to the ingress node to convert the given PVC into an S-PVC. Thus, for example, ingress node 32A in reference network 30 receives two convert instructions or messages; one in respect of PVC $46^{(1)}$ and the other in respect of PVC $46^{(2)}$.

At process step 68, the ingress node creates a P-NNI source-routed S-PVC call set-up message 108, shown (simplified) in FIG. 8, as generally specified in Annex C of the P-NNI reference, for signalling the set-up of an S-PVC across the network 30. In the preferred embodiment, the S-PVC call set-up message includes the following elements:

a. the unique call identifier IE 80;

b. a designated transit list (DTL) 110 specifiing each node and intermediary link (e.g., VP trunk) along the path of the given PVC destined to be converted into an S-PVC; and c. an instruction 111, such as may be provided by an organizational specific IE, which informs the nodes receiving the S-PVC call set-up message 108 to associate the S-PVC being signalled with an existing cross-connection that has been previously tagged with the identical call identifer, without dismantling this cross-connect.

The PVC to S-PVC convert instruction 111 informs the ingress node 32A to construct DTL 110 based on the path definition 18 of the given PVC. The DTL, as will be known to those skilled in the art, is used in the P-NNI protocol to specify each node (and optionally, intermediary link) for setting up a switched connection. Hooks in the call processing software of ingress node 32A instruct it to use DTL 110 based on path definition 18 rather than constructing a DTL in the conventional manner based on internal network topology tables.

At process step 70 (FIG. 4), the S-PVC call set-up message 68 is signalled from the ingress node to the destination or egress node along the path of the PVC being converted. Each node which receives the call set-up message 108 searches its cross-connect definitions for a call ID matching the one sent in message 108. If a match is found, the node then modifies or retags the call type field 94 of the corresponding cross-connect definition entries 90 and 90' to indicate that the tagged cross-connect is associated with an S-PVC as opposed to a PVC. This causes (or the node otherwise causes) the signalling module 42 of the node to assume signalling responsibilities for the bearer channels (i.e., the pre-existing PVC links) between the node and adjacent nodes along the path of the PVC being converted. In the preferred embodiment, each physical port and a range of VPI values associated therewith uniquely map onto one VP trunk 36 and thus each end-point of the tagged cross-connect (identified by physical port/VPI/VCI) maps onto a predetermined VP trunk 36 and its associated signalling link 38. In this manner, the tagged cross-connects of each PVC being converted become associated with the appropriate signalling links 38.

It should be noted that the node does not dismantle the matching or tagged cross-connect by deleting the cross-connect definition entries 90 and 90' and then creating new entries. Rather, the entries are merely relabelled in order to avoid disrupting data flow over the existing connection. This is symbolically shown in FIG. 9, where the pre-existing cross-connects 47 are now utilized by S-PVC $55^{(1)}$ and S-PVC $55^{(2)}$ which have replaced previous PVCs $46^{(1)}$ and $46^{(2)}$.

Once the S-PVC call set-up message 108 reaches the destination node 32, the signalling module 42 thereof is able to resolve the destination end-point specified in DTL 110 of the S-PVC call set-up message 108. The destination node, as is known in the art per se, signals an acknowledgement, such as a P-NNI "connect" message, back to the ingress node 32 using the signalling means. At this point, the ingress node which originated the S-PVC call set-up message 108 is able to ascertain that the corresponding S-PVC has been successfully established. It should be noted that as per the P-NNI S-PVC protocol, the ingress and egress nodes do not forward the signalling messages to the customer premise equipment, and thus the cross-connects linking the edge network nodes 32A and 32E to the connected customer premise equipment are not modified, as symbolically shown in FIG. 9.

At process step 74 (FIG. 4), once the ingress node 32A has been signalled that the S-PVC has been successfully established, the ingress node then transmits a message to the NMS 50 over the virtual control channel 52 informing the NMS 50 that the given PVC has been successfully converted into an S-PVC. The NMS 50 accordingly deletes the corresponding path definition record 18 from its database 54 (but keeps the call definition 12 and reflags it as an SPVC path type).

If for some reason, such as a failed or non-existent signalling link 38, a given PVC cannot be converted into an S-PVC, the S-PVC call set-up message will be cranked back to the ingress node 32A in accordance with the P-NNI signalling protocol. In this event, the ingress node transmits a message to the NMS 50 informing it that a given PVC was not successfully converted into an S-PVC. The NMS 50 then informs the operator.

The DTL 110 is preferably formatted in accordance with the P-NNI protocol so that the source-routed S-PVC call set up message can be processed by the network nodes 32 using pre-existing software. Those skilled in the art will appreciate that a P-NNI DTL specifies the nodes and (optionally) the intermediary links, in a source-routed call set-up message. However, each node which progresses the call determines which particular virtual circuit (i.e., VPI/VCI) should be used on a pre-specified VP trunk based on its available local resources. Thus, the unique call identifier is required in the preferred embodiment in order to identify the particular cross-connections of a PVC destined for conversion since this information is not otherwise provided in the preferred DTL 110. In alternative embodiments, however, the call set-up message could include or carry (e.g., as an organizational specific IE) the full path definition 18 of the PVC being converted. This enables each node to readily identify the cross-connect definition entries 90 and 90' which must be modified thereon, without recourse to the unique call identifier.

The preferred embodiment has also employed a source-routed signalling protocol for establishing S-PVCs. A hop-by-hop signalling protocol may alternatively be used. In such embodiments the unique call identifier is preferably used to indicate the cross-connect which must be modified since no DTL is provided in a hop-by-hop call set-up message. In addition, hooks have to be provided in the call processing software of each node instructing it to progress the call set-up message to the following node in the path of the existing connection (which is indicated by the existing cross-connection) rather than consulting the resident node routing tables for directions on how to progress the call.

In another embodiment, instead of sending the call setup message over the signalling link, the message may alternatively be encapsulated in a special operations, administration and maintenance (OAM) type cell which is sent by the source node over the actual bearer channel of the PVC connection to the destination node. Each node along the PVC connection traversed by this OAM cell extracts the setup message, which it processes in the same manner previously described.

A yet further alternative may be embodied by the NMS directly controlling each node within the PVC connection to invoke the conversion process according to the invention. Upon recept of a cross-connect update message from the NMS, the node would associate the identified cross-connect with the signalling subsystem as described above.

There may also be instances when it is desired to convert an S-PVC into a PVC. For instance, it may be desired to replace a service card (i.e., hardware) which provides the signalling module functions for a given node with a new card, without affecting all of the S-PVCs managed by the card. The preferred procedure for doing so without affecting data flow over the bearer channels is:

1. The node requiring servicing (hereinafter "initiating node") creates a unique call identifier IE 80 (with field 86 appropriately set) for a given S-PVC destined for conversion. The initiating node then sends cross-connect update messages over the virtual control channel 52 to each node in the path of the S-PVC in order to tag the cross-connects thereof and provide a trail which can subsequently be followed.
2. The initiating node sends an S-PVC release message for each S-PVC destined for conversion. The S-PVC release message includes a cause IE, as known in the art, which, for the purposes of the invention, instructs each subsequent node which receives the S-PVC release message to release or disassociate the corresponding cross-connect from the signalling module thereon. However, unlike conventional practice, the cause IE also instructs the nodes not to dismantle the existing cross-connect in order to maintain data flow thereover. If desired, the S-PVC release message can also carry the unique call identifier IE and the step of tagging the affected, existing, cross-connects can occur at this stage rather than at step (1) above.
3. Optionally, the NMS 50 is employed to rebuild each S-PVC into PVCs by following the unique call identifiers across the network. The NMS 50 may also relabel the call type field 94 of the corresponding node cross-connect definition entries 90 and 90' to indicate the connection is a PVC. This step provides added security to the conversion process by ensuring that S-PVCs in the process of conversion are monitored by an external entity.
4. Once all the S-PVCs associated with the initiating node are converted to PVCs, the service upgrade of the initiating node may proceed. Thereafter, an operator may employ the appropriate steps for converting PVCs into S-PVCs as previously described to return to the network to its original state.

Alternatively, instead of releasing the entire SPVC connection (end-to-end), a node can be controlled to convert its SPVC cross-connect to a PVC cross-connect and that node in turn signals both immediately adjacent nodes only to convert their respective cross-connects as well. The adjacent nodes, however, do not further signal the conversion along the SPVC connection (i.e., not end-to-end). The cross-connects can be converted by an SPVC connection at the node and its adjacent nodes following a similar procedure.

Those skilled in the art will appreciate that numerous modifications and variations may be made to the embodiments discussed herein without departing from the spirit and scope of the invention.

What is claimed is:

1. A method of converting an unsignalled permanent connection into a signaled permanent connection in a connection-orientated network, wherein the permanent connection comprises an existing manually configured bearer channel cross-connection on each network node along a path of the permanent connection, said method comprising the steps of:
   a. establishing signalling links between the network nodes in said path;
   b. providing information to identify the existing bearer channel cross-connections along said path;
   c. incorporating said cross-connect identification information in a call set-up message;
   d. transmitting said call set-up message along said path from a source network node to a destination network node; and
   e. associating the existing bearer channel cross-connection of each node along said path with the appropriate signalling links to form said signalled permanent connection.

2. The method according to claim 1, wherein said cross-connect identification information comprises one of
   i. a unique call identifier for said permanent connection, wherein said call identifier is associated with the existing bearer channel cross-connections prior to Step 1(d); and
   ii. a permanent connection path definition specifying each existing bearer channel cross-connection in said path.

3. The method according to claim 2, wherein said call set-up message is signalled over said signalling links and an acknowledgement message is signalled to said source node from said destination node confirming the successful establishment of said signalled permanent connection.

4. The method according to claim 3 wherein said signalling links are manually provisioned.

5. The method according to claim 4, wherein said unique call identifier for the permanent connection is created by a network management system and transmitted to each network node along said permanent connection path.

6. The method according to claim 5, wherein said call set-up message is created by one of said source node and said network management system.

7. The method according to claim 6, wherein said call set-up message specifies the intermediate nodes along said permanent connection path.

8. The method according to claim 7, wherein said permanent connection is a permanent virtual connection (PVC) and said signalled permanent connection is a soft permanent virtal connection (S-PVC) of an asynchronous transfer mode (ATM) network.

9. A method of converting an unsignalled permanent connection into a signalled permanent connection in a connection-orientated network, wherein said permanent connection is managed by a network management em which stores a permanent connection path definition specifying existing manually configured bearer channel cross-connects made on each network node along the path of the permanent connection, said method comprising the steps of:

a. establishing signalling links between the network nodes along said path;

b. providing information to identify the existing bearer channel cross-connections along said path;

c. incorporating said cross-connect identification information in a signalled permanent connection call set-up message;

d. signalling said call set-up message over said signalling links along said path from a source network node to a destination network node; and e. employing said identified existing bearer channel cross-connection on each said node for said signalled permanent connection.

10. The method according to claim 9, wherein said cross-connect identification information comprises one of i. a unique call identifier for said path, wherein said call identifiers is transmitted by said network management system to each said node prior to step 9(d); and ii. said path definition.

11. The method according to claim 10, including the step of signalling an acknowledgement message to said source node from said destination node confirming the successful establishment of said signalled permanent connection.

12. The method according to claim 11, wherein said network management system deletes said permanent connection path definition therefrom.

13. The method according to claim 10, wherein said signalling links are manually provisioned.

14. The method according to claim 10, wherein said call set-up message is created by one of said source node and said network management system.

15. The method according to claim 14, wherein said call set-up message specifies the intermediate nodes along said permanent connection path.

16. The method according to claim 10, wherein said permanent connection is a permanent virtual connection (PVC) and said signalled permanent connection is a soft permanent virtual connection (S-PVC) of an asynchronous transfer mode (ATM) network.

17. Apparatus for converting unsignalled permanent connection into a signalled permanent connection in a connection-orientated network comprising interconnected network nodes, said apparatus comprising:

signalling means for communicating signalling messages between network nodes along a path of said permanent connection;

a network management system, connected to said network nodes along said path, said system including means for providing information to identify an existing manually configured bearer channel cross-connection made on each network node along said path; and call processing means distributed on each said node along said path for incorporating said cross-connect identification information in a call set-up message, signalling said call set-up message along said path from a source node to a destination node, and associating the existing bearer channel cross-connection identified on each said node along said path with said signalling means to form said signalled permanent connection.

18. The apparatus according to claim 17, wherein:

said cross-connect identification information comprises a unique call identifier;

said network management system comprises means for transmitting said unique call identifier to the nodes along said path; and said nodes include means for associating the unique call identifier with the corresponding existing bearer channel cross-connection.

19. The apparatus according to claim 18, wherein said permanent connection is a permanent virtual connection (PVC) and said signalled permanent connection is a soft permanent virtual connection (S-PVC) of an asynchronous transfer mode (ATM) network.

20. The apparatus according to claim 17, wherein said cross-connect identification information comprises the specific identity of all said existing bearer channel cross-connections along said path.

21. The apparatus according to claim 20, wherein said permanent connection is a permanent virtual connection (PVC) and said signalled permanent connection is a soft permanent virtual connection (S-PVC) of an asynchronous transfer mode (ATM) network.

22. A method of converting an unsignalled permanent connection into a signalled permanent connection in a connection-orientated network, wherein said permanent connection comprises a series of bearer channels manually cross-connected on each network node along a permanent connection path, said method comprising the steps of:

a. establishing signalling links between the network nodes in said path;

b. providing information to identify existing manually configured cross-connections for the bearer channels along said path;

c. incorporating said cross-connect identification information in a call set-up message;

d. signalling said call set-up message over said signalling links along said path from a source network node to a destination network node; and e. associating the bearer channels along said path with the appropriate sigalling links without dismantling said existing cross-connections in order to form said signalled permanent connection.

23. The method according to claim 22, wherein said cross-connect identification information comprises one of i. a unique call identifier for said permanent connection, wherein said call identifier is associated with the existing cross-connections prior to Step 28(d); and ii. a permanent connection path definition specifying each existing cross-connection is said path.

* * * * *